Figure 1:
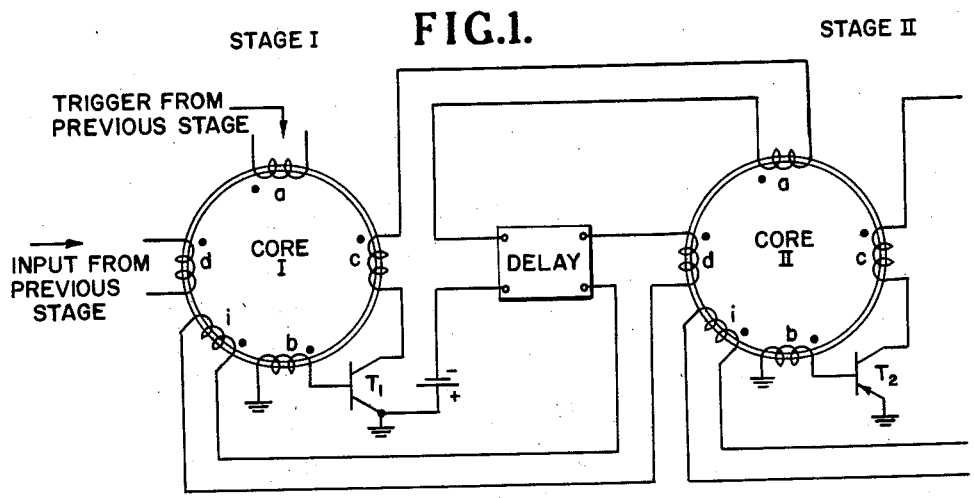

Feb. 12, 1963    H. R. IRONS    3,077,543
BINARY COUNTER FOR ELECTRICAL PULSES
Filed July 24, 1959    4 Sheets-Sheet 1

INVENTOR,
H. R. IRONS

BY

ATTORNEYS.

INVENTOR.
H. R. IRONS

Feb. 12, 1963  H. R. IRONS  3,077,543
BINARY COUNTER FOR ELECTRICAL PULSES
Filed July 24, 1959  4 Sheets-Sheet 3
FOR A FLUX CHANGE
OF $+B_r$ TO $-B_r$
IN CORE II
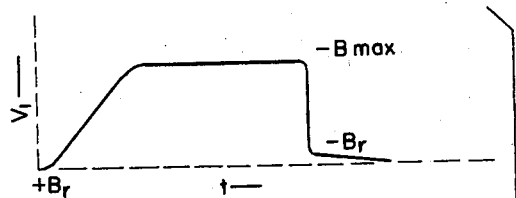
FOR A FLUX CHANGE
OF $-B_r$ TO $+B_r$
IN CORE II
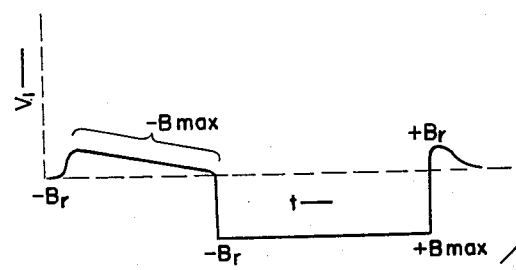
FIG.5.
$V_1$ 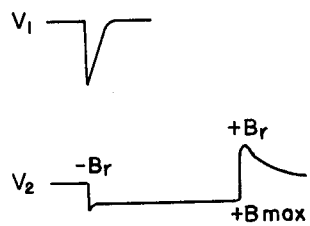 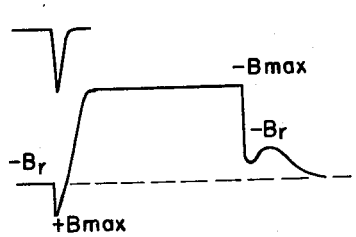
$V_2$
FIG.8.
$V_3$ 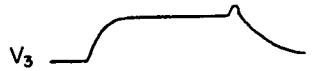 
$V_4$  
INVENTOR.
H. R. IRONS
BY
ATTORNEYS.

Feb. 12, 1963   H. R. IRONS   3,077,543
BINARY COUNTER FOR ELECTRICAL PULSES
Filed July 24, 1959   4 Sheets-Sheet 4

INVENTOR.
H. R. IRONS
BY
ATTORNEYS.

United States Patent Office 3,077,543
Patented Feb. 12, 1963

3,077,543
BINARY COUNTER FOR ELECTRICAL PULSES
Henry R. Irons, Washington, D.C., assignor to the United States of America as represented by the Secretary of the Navy
Filed July 24, 1959, Ser. No. 829,473
7 Claims. (Cl. 307—88)
(Granted under Title 35, U.S. Code (1952), sec. 266)

The invention described herein may be manufactured and used by or for the Government of the United States of America for governmental purposes without the payment of any royalties thereon or therefor.

This invention relates to a binary trigger circuit involving transistor-magnetic memory devices in counter circuits utilizing such binary trigger circuits.

Elements made of materials having substantially rectangular hysteresis loops generally have two stable states and may be employed as binary information storage elements. These elements, such as ferromagnetic cores, are relatively small components requiring a small power supply and having a relatively long life. Circuits employing rectangular hysteresis loop elements are disclosed by Guterman and Carrey on pages 84 to 94 of the IRE Convention Record, Part IV. However, in this type of circuitry the delay network will have a certain attenuation on the signal passing through it. Since the signal must be large enough to change the state of the core connected to the delay network, the energy loss will be quite large, unless an elaborate delay network is used. Further, when the state of the core is changed by the transistor it must provide enough current to switch the core and to overcome the currents flowing in the windings which result in a loss of energy that could otherwise be used in switching the core more rapidly. In addition, if the switching times of the cores are not carefully matched the second transistor in the circuit may cease conducting before the first transistor and the current from the first transistor will then cause the flux in the core to change from one state towards another. Upon the next input signal, the second core will then produce a spurious current in the second transistor, thus increasing the delay time of the inter-core network. This situation can only be alleviated by use of a complicated delaying network.

It is an object of this invention to provide a new and improved binary counting device employing rectangular hysteresis elements as dynamic circuit components.

It is a further object of this invention to provide energy means stored in the cores to trigger the transistor associated with it to provide the binary counting action.

It is another object of this invention to provide means whereby the flux change in the core is used to inhibit the action of the transistors associated with said core.

It is another object of this invention to provide a magnetic system that is simple in construction, having low power requirements and having fast operating characteristics.

It is a further object of this invention to provide a storage network of simpler design than previously known in the prior art.

It is still a further object of this invention to provide a circuit such that the switching time for the cores is not as critical as that known in the prior art.

Further objects and the entire scope of the invention will become further apparent from the following detailed description and in the appended claims.

The accompanying drawings display the general construction and operational principles of the invention.

It is to be understood, however, that said drawings are furnished only by way of illustration and not in limitation thereof.

Figure 2:
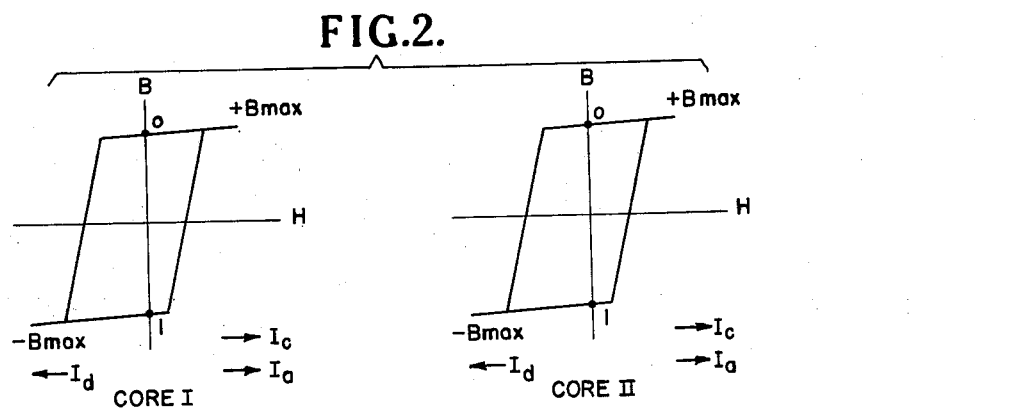
Figure 3:
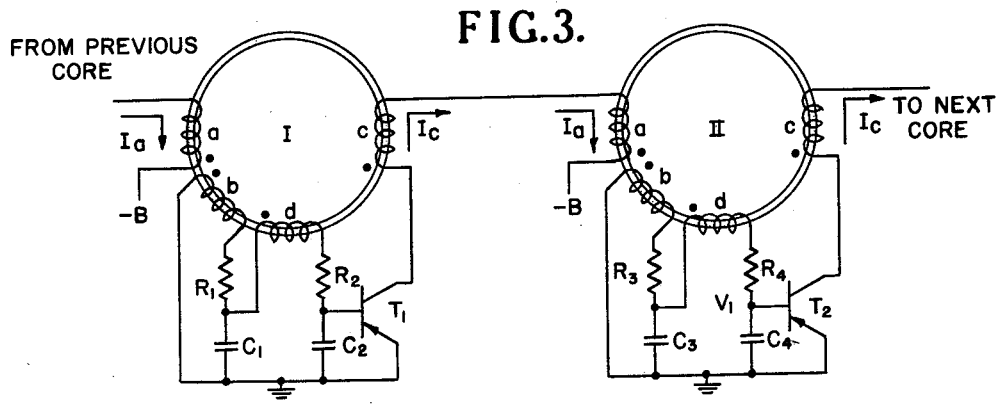
Figure 4:
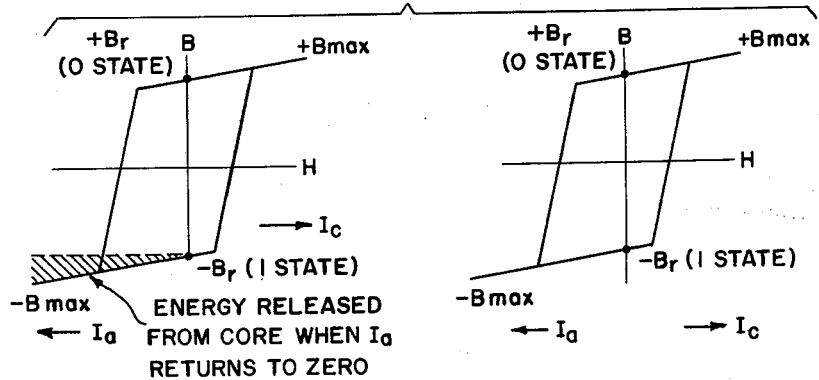

In the drawings:
FIG. 1 is a circuit diagram of a binary counting device well known in the art;
FIG. 2 is a graph of a hysteresis characteristic of the magnetic cores employed in the circuit of FIG. 1;
FIG. 3 is a circuit diagram of the new binary counting device disclosing the applicant's invention;
FIG. 4 is a graph of the hysteresis characteristic of the magnetic cores employed in the circuit of FIG. 3;
FIG. 5 discloses the voltage wave form taken at $V_1$ in FIG. 3;
FIGS. 6, 7, 9 and 10 are modifications of FIG. 3 to be more fully explained herein; and
FIG. 8 discloses the voltage wave form taken at various points in FIG. 7.

In order to more fully understand applicant's invention the prior art as indicated by FIG. 1 will be explained. It will be understood the relative series of linkage of the windings on each core are indicated by dots adjacent one of the terminals of each winding in accordance with the usual custom well known in the art. In FIG. 1, assume core I is in the magnetic state indicated by 0 of FIG. 2. If a trigger pulse now arises from the previous stage it will change the field in core I in the direction shown by $I_a$ in FIG. 2 and there will be only a small increase in the flux in the core from the value at 0 to $+B_{max}$. This change in flux will not produce sufficient voltage in windings $b$ and $c$ of the core to produce a collector current in the transistor and hence the trigger pulse produces no change in the state of core I or core II. If an input is applied to $d$ of core I the state of this core will change from 0 to 1, as shown in FIG. 2, but no current will flow in the transistor and hence core II will not be disturbed.

If core I is in the number one stage when a trigger pulse arises it will produce a change in the flux in the core I thus producing a large voltage in winding $b$ which causes the transistor to pass a current in winding $c$. The current in winding $c$ increases the voltage in winding $b$ causing the current in winding $c$ to increase also. This regenerative action will increase until the voltage across winding $c$ reaches a limiting value imposed by the battery voltage. As this proceeds, the flux in the core I is changing in positive direction from 1 and will reach a limiting value of $B_m$ at which point the voltages across windings $c$ and $b$ will decrease to zero and the transistor current will drop to zero.

Each time core I goes through the cycle wherein the flux is changed from 1 to $+B_{max}$ by the transistor current, core II takes one of two possible actions depending on the state of the core at that time. If core II is in the 1 state as shown in FIG. 2, it will go to the 0 state and if it is in the 0 state it will change to the 1 state. This is the type of action required of a binary counting device. The details of this counting action are described as follows:

If core II is in the 0 state and the transistor current from the previous state flowing in will not cause the transistor $T_2$ to conduct.

The delay output from transistor $T_1$ flowing in winding $d$ of core II causes a flux in the core to change from 0 state to 1 state. If core II is in the 1 state when the current pulse from transistor $T_1$ passes through winding $a$, the transistor $T_2$ will conduct and switch the core from the 1 state to the 0 state. The delay output from transistor $T_2$ applied to the winding $i$ on core II will prevent the delay output of transistor $T_1$ from changing the core II from state 0 to state 1. In the above circuit all the transistors are in a non-conducting state between pulses.

The disadvantages of this method in the prior art will be described as follows:
(a) The delaying network will have a circuit attenuation for the signal passing through it. Since the signal must be large enough to change the state of the core connected to the delay network, the energy loss will be quite large, unless an elaborate delay network is used.

(b) When the transistor $T_2$ changes the state of core II it must pass enough current to switch the core and to overcome the currents flowing in winding $a$ and winding $d$ due to the current from transistor $T_1$. Thus transistors $T_1$ and $T_2$ are working in opposite directions on core II resulting in a loss of energy that could otherwise be used in switching the core more rapidly.

(c) If the switching times of the cores are not carefully matched transistor $T_2$ may cease conducting before transistor $T_1$ and the current from transistor $T_1$ will then cause the flux in core II to change from zero state towards the number one state. The next input to core II will then produce a spurious current in transistor $T_2$. Increasing the delay time in the intercore network will alleviate this difficulty but this requires a very complicated delaying network.

Applicant's new and novel binary counting circuit is shown in FIG. 3. This circuit contains transistors $T_1$ and $T_2$, resistors $R_1$–$R_4$, capacitors $C_1$–$C_4$ and a plurality of windings on the magnetic cores which have a rectangular hysteresis loop as shown in FIG. 4. The combination of transistors $T_1$ and the windings $c$, $d$, and $b$ located on core I form a regenerative circuit which can change the state of core I from 1 to 0 state when the circuit is triggered from the previous core. The current from transistor $T_1$ flowing in winding $a$ of the next core will trigger the transistor $T_2$ if core II is at state 1 thus changing the flux in core II from state 1 to state 0. If core II is in the 0 state, the current from transistor $T_1$ will change the flux in core II from 0 state to 1 state but will not trigger transistor $T_2$.

The operation of this unit will now be more fully described. The current $I_a$ that flows in the winding $a$ of core I produces a voltage in the opposite direction to that required to turn the transistor $T_1$ on. However, when $I_a$ suddenly drops to zero, a voltage is induced in the windings $b$ and $d$ that will cause transistor $T_1$ to conduct and start the regenerative action that switches core I from 1 to 0 state. The shaded area in FIG. 4 indicates the amount of energy available for triggering transistor $T_1$.

If core II is also in state 1 transistor $T_2$ will be triggered at the end of the current pulse in winding $a$ of core II, thus changing core II from the 1 state to the 0 state. However, if core II is already in the 0 state the current in winding $a$ will switch the core from 0 to 1 state. During this switching process positive voltages are developed on $C_3$ and $C_4$. The time constants for $R_3C_3$ and $R_4C_4$ are sufficiently long that these positive voltages prevent the voltage pulses that appear in windings $b$ and $d$, when $I_a$ turns off, from turning on transistor $T_2$. The voltage wave forms of the circuit of FIG. 3 are helpful in understanding the operation of a circuit and these are shown in FIG. 5.

It can be easily seen that this circuit wastes very little power and almost all the current the transistors can pass is used in changing the flux in the cores. This permits fast operation for a limited amount of transistor dissipation. This also results in the number of windings on the core being less as fewer turns are required. It also results in the storage network $R_1$, $R_2$ and $C_1$, $C_2$ being much simpler than that of the delaying network used in the prior art. Further, the switching times of the cores does not have to be matched as closely as in the circuit described for the prior art. For example, if the current from transistor $T_1$ turns off slightly before core II is completely switched from 0 to 1 state, the next pulse into core II will not produce a spurious signal in transistor $T_2$ as it did in the circuit for the prior art. The only effect will be a build up of positive voltages on $C_3$ and $C_4$. These voltages will have ample time to discharge before the input current turns off and thus will not effect the operation. This circuit also utilizes the energy stored in the core when the flux is at $B=-B_{max}$ which is used to trigger the transistor. This energy is not used in the circuit described for the prior art.

Figure 6:
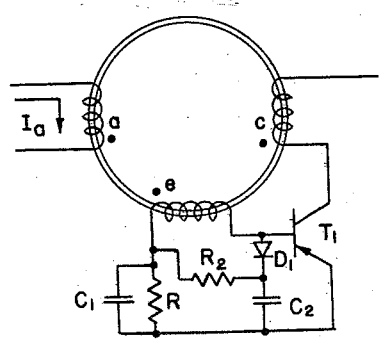

At FIG. 6 is shown alternate circuit input for FIG. 3. A somewhat more effective circuit is obtained if windings $b$ and $d$ and the storage network are replaced by the circuit as shown in FIG. 6. In the circuit as shown in FIG. 3 $R_2$ and $C_2$ limit the rise time of the pulse which triggers transistor $T_1$ and hence reduces the speed of the circuit. As disclosed in FIG. 6, diode $D_1$ is an open circuit when the negative trigger is applied hence $C_2$ is effectively not in the circuit. Capacitor $C_1$ provides a shunt across resistor $R_1$ during the regenerative build up of the base current of transistor $T_1$. The action which prevents the trigger signal in the winding $e$ from producing a base current in transistor $T_1$ after the current in winding $a$ has switched the core is due to the hole storage effect in a semi-conductor diode $D_1$. During the time the current in winding $a$ is switching the core, diode $D_1$ is passing a current which charges capacitor $C_2$ through a positive value and passes a current through resistor $R_2$. The hole storage in diode $D_1$ due to this current makes the said diode a low impedance to current flow in the reverse direction until all the holes are removed from the semiconductor material. Therefore, when the trigger pulse appears across winding $e$ due to the termination of the current in winding $a$, the base of the transistor is connected through the low impedance of the diode to the positively charged capacitor $C_2$. The trigger pulse is expended in reducing the charge of capacitor $C_2$ and transferring it to capacitor $C_1$. By proper choice of capacitors $C_1$ and $C_2$, the base will remain positive during the duration of the trigger pulse.

The input to the binary counter can be obtained from a blocking oscillator which is triggered by the pulses to be counted. The blocking oscillator is designed to produce pulses that will completely switch the flux in the input core of the counter.

Figure 7:
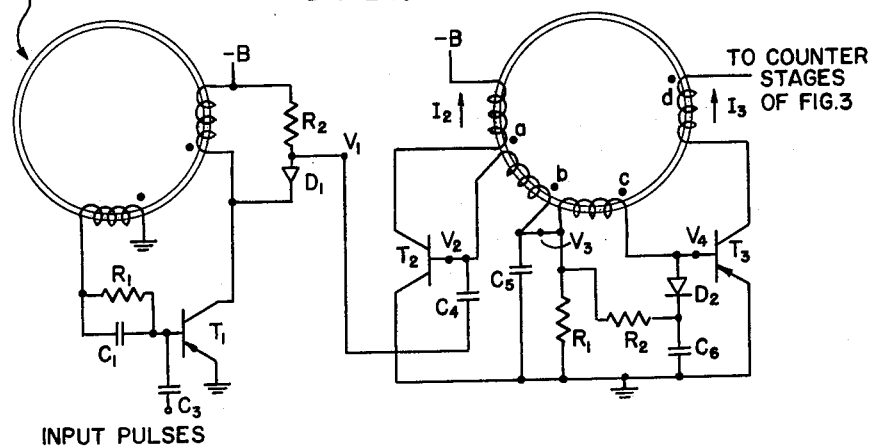

Reference is now made to FIG. 7 which discloses an efficient scheme for the input circuit. This circuit increases the maximum counting speed of the system by a factor of 2. The blocking oscillator shown is of the type, well known in the art, that is triggered and produces a single output pulse of standard size each time a pulse is applied to the input. The operation of the first stage of the counter will be explained with the aid of the circuit wave forms as shown in FIG. 8.

Assume, for the purpose of description, that core I is initially in the flux state $-B_r$ after the current $I_3$ has passed through winding $d$, as shown in FIG. 7. The wave form $V_1$ from the blocking oscillator will cause transistor $T_2$ to conduct. The resulting current in winding $a$ is in the proper direction to completely change the flux state of the core from $-B_r$ to $+B_m$ due to the regenerative action of transistor $T_2$ and windings $a$ and $b$ of the core I. During this time the positive voltage $V_3$ has built up across capacitor $C_5$ due to the flow of the base current to transistor $T_2$. The voltage induced in the winding $c$ has produced a positive voltage across capacitor $C_6$. The positive voltage across capacitor $C_6$ and that across capacitor $C_5$ prevent the induced voltage in winding $c$, which occurs when transistor $T_2$ turns off, from turning on the transistor $T_3$. The hole storage in diode $D_2$ serves a useful purpose as described previously in connection with FIG. 6. The flux in the core is at a $+B_r$ at the end of this cycle. When the next pulse arrives from the blocking oscillator it again causes the current to flow in transistor $T_2$. However, the core had already been saturated in the direction caused by the current $I_2$ and hence the flux change in the core can only be from the $+B_r$ to the $+B_{max}$ (FIG. 4). When this flux change has occurred the voltage in winding $b$ of FIG. 7 must drop to zero and the current through transistor $T_2$ turns off. The stored energy in the core then produces a voltage in winding $c$ which is in the proper direction to turn on transistor $T_3$. In this case the voltages across capacitors $C_6$ and $C_5$ are not large enough to prevent the voltage in winding $c$ from producing a base current in transistor $T_3$. The regenerative action caused by transistor $T_3$ and the windings $b$ and $c$ of the core I caused the flux to change from the $+B_r$ to $-B_{max}$. The current from transistor $T_3$ ceases when the flux reaches $-B_{max}$ and a voltage is produced in winding $b$ which is in the proper direction to cause a base current in transistor $T_2$. However, the positive voltages that have been built up on capacitors $C_5$ and $C_4$ produce a net voltage at $V_2$ which is slightly positive and hence no base current is produced in transistor $T_2$.

From the description above it is seen that transistor $T_3$ conducts on every other pulse produced by the blocking oscillator. Therefore, the pulses being applied to core II occur only half as often as those arising from the blocking oscillator, thus illustrating the counting action of core I. The counting stages that follow core I are of the type described previously. Core I and its associated components form a complementing flip-flop circuit arrangement which is used as the basis of the binary addition system described in a copending application.

Figure 9:
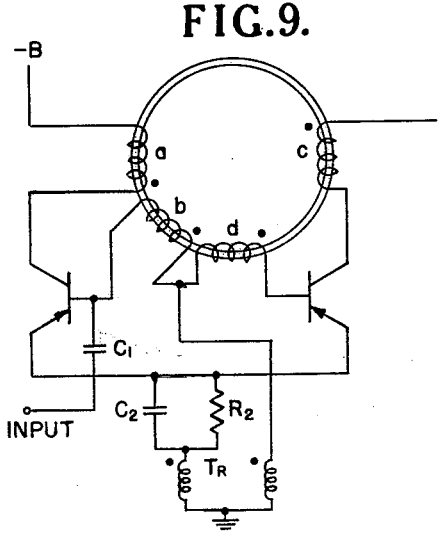

The complementing flip-flop can also be constructed in a form shown in FIG. 9. Here the voltage developed across the capacitor $C_2$ during the conduction time of either transistor prevents the other transistor from turning on as the conducting transistor turns off. The transformer $T_R$ is an optional feature that provides an additional voltage on the base of the transistor that assists in keeping one transistor from turning on as the others turn off.

Figure 10:
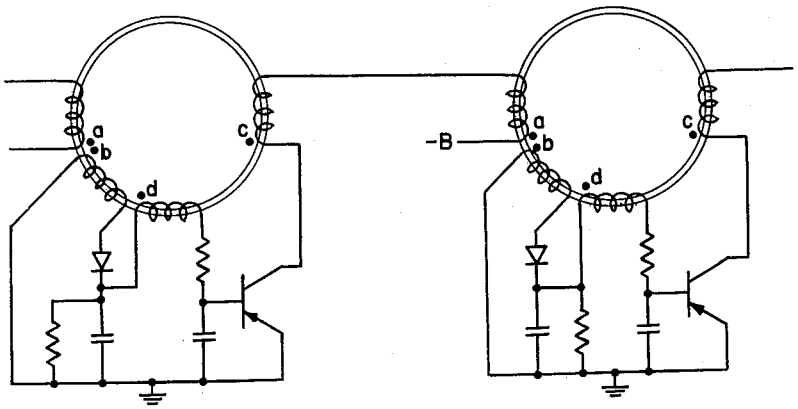

An alternate method of construction for FIG. 3 is also shown in FIG. 10. The operation is very similar to that described for FIG. 3. It is also possible by additional modification to convert the cores of FIG. 3 from binary counters to tertiary counters. By this arrangement each core can be used to provide a count of number 3 rather than the count of number 2 corresponding to the $+B_r$ and $-B_r$ points of the hysteresis curve. To do this the number of turns in a winding $a$ (as shown in FIG. 3) is reduced by $1/\sqrt{2}$. The outward pulses from core I will then have the proper duration and intensity to change the flux in core II from $+B_r$ to 0 flux in one pulse of output of core I. The second pulse output of core I will change the flux in core II from zero to $-B_r$. The third pulse from core I will start a regenerative action in core II that will change its flux from $-B_r$ to $+B_r$. Transistor $T_2$ thus produces a pulse output for every third pulse produced by transistor $T_1$ thereby providing the tertiary counting desired.

Thus, by means of this invention, a new and improved circuit is provided for translating signals between binary elements that have a rectangular hysteresis characteristic, a circuit wherein the stored energy of the core is used to trigger the transistor associated therewith to provide the binary counting action. Applicant also provides a method whereby the change in the core is used to inhibit the action of the transistor associated therewith under certain predetermined conditions. This invention also utilizes the whole storage effect in the diode as shown in FIG. 6 to provide the necessary inhibiting action for the transistor.

It will be understood that the foregoing examples are merely illustrative and it is not intended that the invention be limited in any manner other than recited by the appended claims.

What is claimed as new and desired to be secured by Letters Patent of the United States is:

1. A binary counter device comprising at least a first and second saturable magnetic core connected in tandem, each of said first and second cores having a first and second stable state, an input winding mounted on each of said cores for generating sufficient flux density in the core to enable each of said cores to switch from a first stable state to a second stable state or to saturate the core when it is already in the second stable state, a regenerative circuit means mounted on each of said cores, said regenerative circuit means including a pair of regenerative windings mounted on said core to generate a voltage in proportion to the change of the magnetic flux in the core, a transistor electrically connected in said regenerative circuit means in such manner that it is normally biased to an off state by the voltage induced in said regenerative windings, an output winding mounted on said first core having one end thereof connected to said transistor and the other end to the input winding of the second core whereby said input winding of the first core receives a first signal pulse which switches the first core from the first stable state to the second stable state, said input winding receives a second signal pulse saturating the first core to a high density magnetic state which decays back to the second stable state providing sufficient energy to bias the transistor to an on state and generate an output signal through the output winding of the first core to switch the first core back to the first stable state and concurrently therewith switches the second core to a second stable state.

2. A binary counter circuit comprising a plurality of magnetic elements in series relation, each of said plurality of elements having a first stable state and a second stable state, an input winding located on each of said plurality of elements, an output winding located on each of said plurality of elements, said output winding of each element being continuously electrically connected to the input winding of the adjacent element, a regenerative transistor means located on each of said plurality of elements and electrically connected to said output winding and the next succeeding input winding for providing a signal through the output winding to change the state of the core and providing a signal to the input winding connected thereto, means located in said transistor means for normally biasing said transistor means in an off state, signal means connected to the input winding of the first of said plurality of serially connected elements for generating signals thereto, a first signal pulse from said signal means to said input winding changing the first element from a first stable state to the second stable state, a second signal pulse from said signal means to said input winding causing the first element to reach a high degree of flux saturation, decay of the flux saturation from the second signal generating a voltage to actuate said transistor means, said transistor means generating a signal through said output winding to change the element from the second stable state to the first stable state and changing the adjacent element from a first stable state to a second stable state.

3. A binary counter device comprising a first magnetic core, a second magnetic core, a first regenerative means mounted on said first magnetic core, a second regenerative means mounted on said second core, said first and second magnetic cores having a first and second stable state of flux saturation respectively which may be changed by proper saturation of the respective core, a first and second trigger means located on said first and second cores, respectively, for saturating said cores when energized by a signal pulse, signal means connected to said first trigger means for providing a signal pulse thereto, a first and second output winding mounted on said first and second cores, respectively, for saturating said first and second cores when energized by said first and second regenerative winding, respectively, said second triggering means being constantly connected to said first output winding and actuated by the signal from said first regenerative winding, a first signal pulse from said signal means energizing said first trigger means saturating said first core and switching it from the first stable state to the second stable state, a second signal pulse from said signal means energizing said first trigger means highly saturating said first core, the energy stored in the core from the second signal pulse actuating and energizing said first regenerative means generating a signal pulse through the first output winding and the second trigger means whereby the first core is switched from the second stable state to the first stable state and the second core is switched from the first stable state to the second stable state.

4. In a binary counting device comprising a plurality of saturable cores connected in tandem for operation in successive order, each of said cores having a substantially rectangular hysteresis characteristic, a regenerative circuit means inductively coupled to each of said saturable cores for driving the cores from a first magnetic state to a second magnetic state, said regenerative circuit means comprising a pair of windings serially connected and mounted on said saturable core, one leg of each winding being serially connected to a resistor and capacitor, a transistor connected electrically between the resistor and the capacitor of one of the windings, the collector of said transistor being electrically connected to one side of an output winding, an input winding inductively coupled to each of said cores, an output winding inductively coupled to each of said cores, said input winding being continuously connected to the output winding of the preceding saturable core except for the first and last core, energy means generating a first pulse current to flow in the input winding for shifting the stable state of the core from the first stable state to the second stable state, said energy means generating a second pulse current to flow in the input winding causing the flux in the core thereof to reach a high flux density, decay of the high flux density inducing a voltage of sufficient value and polarity to actuate the regenerative circuit means, the output winding and the input winding on the next succeeding core for shifting the core to the first stable state and concurrently therewith the next succeeding core is shifted from the first stable state to the second stable state.

5. A counting circuit comprising a plurality of tandem connected counter stages, each adapted to produce an output pulse from output terminals thereof upon reception of a predetermined number of input pulses at the input terminals thereof, each stage of said plurality of stages including a saturable magnetic core having a substantially rectangular hysteresis characteristic, signal input means including an input winding having input terminals thereon mounted on said core,
an output winding having output terminals thereon mounted on said core,
regenerative circuit means coupled between said input winding and said output winding on said core; said regenerative circuit means including reset winding means wound on said core and coupled to said input and output windings;
said regenerative circuit means further including threshold voltage switching means having a time constant circuit connected at the input thereof; said time constant circuit coupled to said reset winding means; said switching means coupled to said output winding,
means for biasing said switching means into conduction thereby initiating regenerative action in said regenerative circuit to drive said core from a first stable state of magnetization to a second stable state of magnetization,
means for switching said core from said second stable state of magnetization to said first stable state of magnetization whereby said time constant circuit means is energized; said time constant circuit maintaining said switching means nonconductive for a predetermined time while said core is being switched from said second stable state of magnetization to said first stable state of magnetization.

6. A counting circuit comprising:
a plurality of tandem connected counter stages, each adapted to produce an output pulse from output terminals thereof upon reception of a predetermined number of input pulses at input terminals thereof,
each stage of said plurality of stages including a saturable magnetic core having a substantially rectangular hysteresis characteristic,
an input winding having input terminals thereon mounted on said core,
an output winding having output terminals mounted on said core,
reset winding means coupled between said input winding and said output winding on said core;
said reset winding means including regenerative means connected continuously to said output winding and an input winding on the next counter stage for changing the magnetic state of the counter stage and concurrently therewith the state of the next succeeding counter stage;
said regenerative means including a pair of regenerative windings located on said counter stage that are electrically interconnected to an R.C. storage network,
a transistor having an emitter and base electrically connected to said regenerative windings and R.C. storage network respectively in such manner that said transistor is normally biased to an off state, the collector of said transistor being connected to the output winding, said regenerative winding generating a voltage to bias the transistor to an on state due to the decay of flux in the counter stage when the input signal does not change the state of the core.

7. The combination in claim 5 wherein said signal input means includes
an oscillator means for receiving various input signals and producing an output signal of constant magnitude, said constant magnitude signal being electrically connected to said input winding.

References Cited in the file of this patent

UNITED STATES PATENTS

| | | |
|---|---|---|
| 2,591,406 | Carter | Apr. 1, 1952 |
| 2,824,698 | Van Nice et al. | Feb. 25, 1958 |
| 2,863,138 | Hemphill | Dec. 2, 1958 |
| 2,876,438 | Jones | Mar. 3, 1959 |
| 2,902,609 | Ostroff et al. | Sept. 1, 1959 |

OTHER REFERENCES

Pike: "Multiple Pulse Prevention in Magnetic Counter," RCA TN No. 52. (Copy in Div. 42.)